(12) United States Patent
Shimizu et al.

(10) Patent No.: US 9,946,329 B2
(45) Date of Patent: Apr. 17, 2018

(54) ELECTRONIC APPARATUS

(71) Applicant: Kabushiki Kaisha Toshiba, Minato-ku, Tokyo (JP)

(72) Inventors: Shoichi Shimizu, Kawasaki Kanagawa (JP); Shigenobu Ohmae, Fujisawa Kanagawa (JP); Nozomu Okazaki, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 410 days.

(21) Appl. No.: 14/701,076

(22) Filed: Apr. 30, 2015

(65) Prior Publication Data

US 2016/0181801 A1 Jun. 23, 2016

Related U.S. Application Data

(60) Provisional application No. 62/095,221, filed on Dec. 22, 2014.

(51) Int. Cl.
*G06F 1/32* (2006.01)
*G06F 3/06* (2006.01)
*G06F 1/26* (2006.01)

(52) U.S. Cl.
CPC .............. *G06F 1/3275* (2013.01); *G06F 1/26* (2013.01); *G06F 1/266* (2013.01); *G06F 1/3221* (2013.01); *G06F 1/3225* (2013.01); *G06F 1/3268* (2013.01); *G06F 3/06* (2013.01); *Y02B 60/1228* (2013.01); *Y02B 60/1246* (2013.01)

(58) Field of Classification Search
CPC .......... G06F 1/26; G06F 1/266; G06F 1/3221; G06F 1/3268; G06F 1/3287; G06F 3/0601; G06F 3/0674; G06F 11/3034; G06F 13/4022; Y02B 60/1246
See application file for complete search history.

(56) References Cited

U.S. PATENT DOCUMENTS

| | | | | |
|---|---|---|---|---|
| 7,783,802 B1 * | 8/2010 | Nemazie | ............... | G06F 1/3221 370/229 |
| 7,929,383 B2 | 4/2011 | Yamazaki et al. | | |
| 8,051,309 B2 | 11/2011 | Kashi et al. | | |
| 8,570,160 B2 | 10/2013 | Speegle et al. | | |
| 8,627,122 B2 * | 1/2014 | Lu | ......................... | H02J 7/0004 713/300 |

(Continued)

OTHER PUBLICATIONS

USB Battery Charging Specification, Revision 1.1, Apr. 15, 2009.*

*Primary Examiner* — Jaweed A Abbaszadeh
*Assistant Examiner* — Brian J Corcoran
(74) *Attorney, Agent, or Firm* — White & Case LLP

(57) ABSTRACT

According to one embodiment, an electronic apparatus includes a connector, power circuit, and controller. The connector is connectable to a first or second external device. The connector includes a first contact configured to receive a first signal from the first external device or a second signal from the second external device. The second signal is different from the first signal and configured to control power inside the electronic apparatus. The power circuit is configured to generate power inside the electronic apparatus using voltage from the first external device or the second external device. The controller is configured to supply a control signal based on the second signal to the power circuit when the first contact receives the second signal.

20 Claims, 9 Drawing Sheets

(56) References Cited

U.S. PATENT DOCUMENTS

| | | | |
|---|---|---|---|
| 2014/0133240 A1* | 5/2014 | Chen | G11C 16/30 365/185.18 |
| 2016/0011238 A1* | 1/2016 | Kulkarni | G01R 17/02 320/137 |
| 2016/0036254 A1* | 2/2016 | Jeong | H02J 7/0029 320/137 |

* cited by examiner

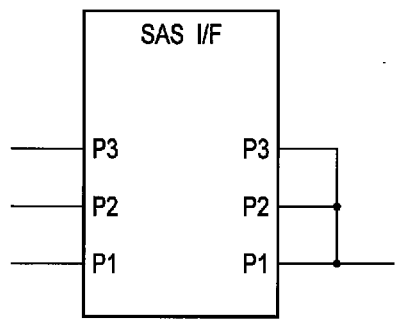
F I G. 1A
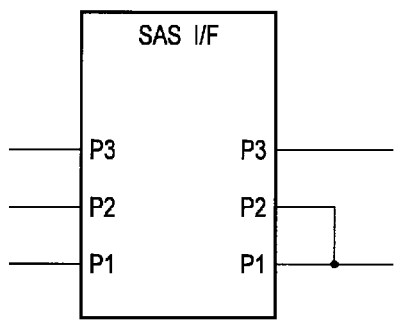
F I G. 1B
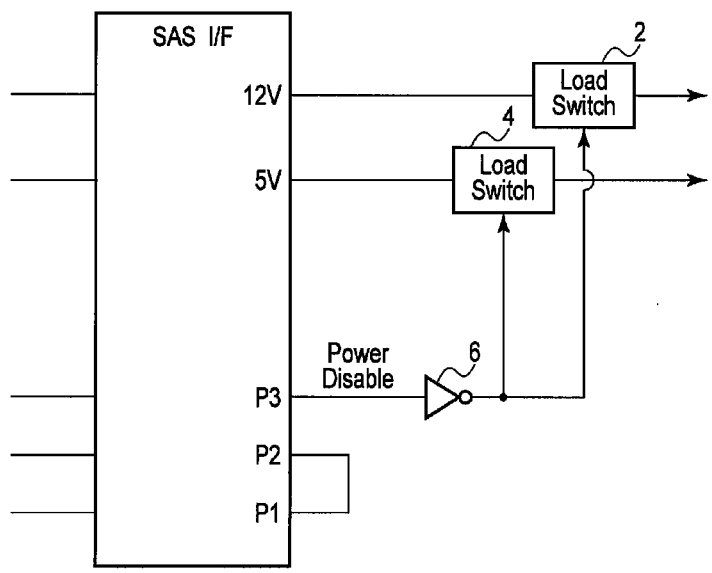
F I G. 1C

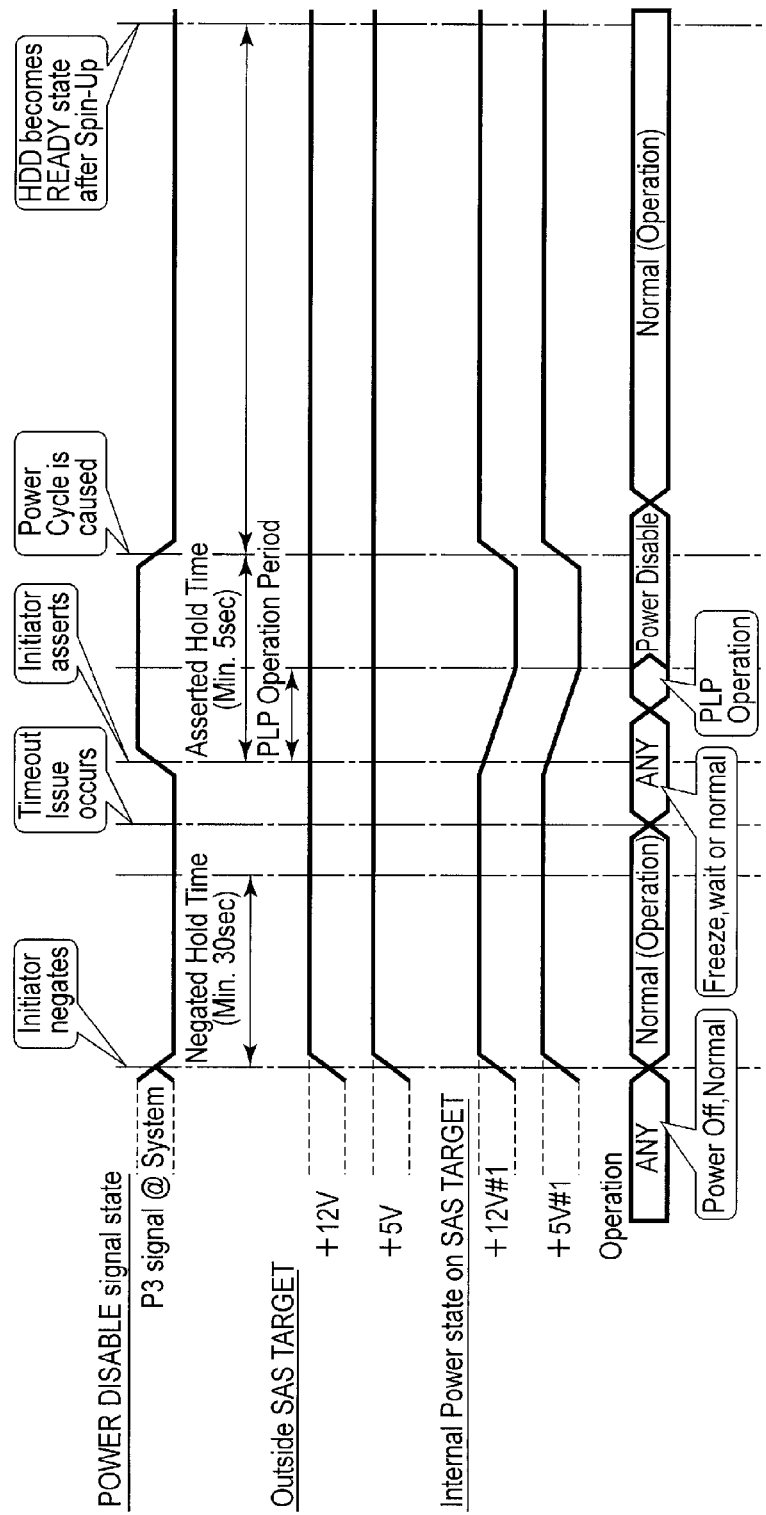
F I G. 2

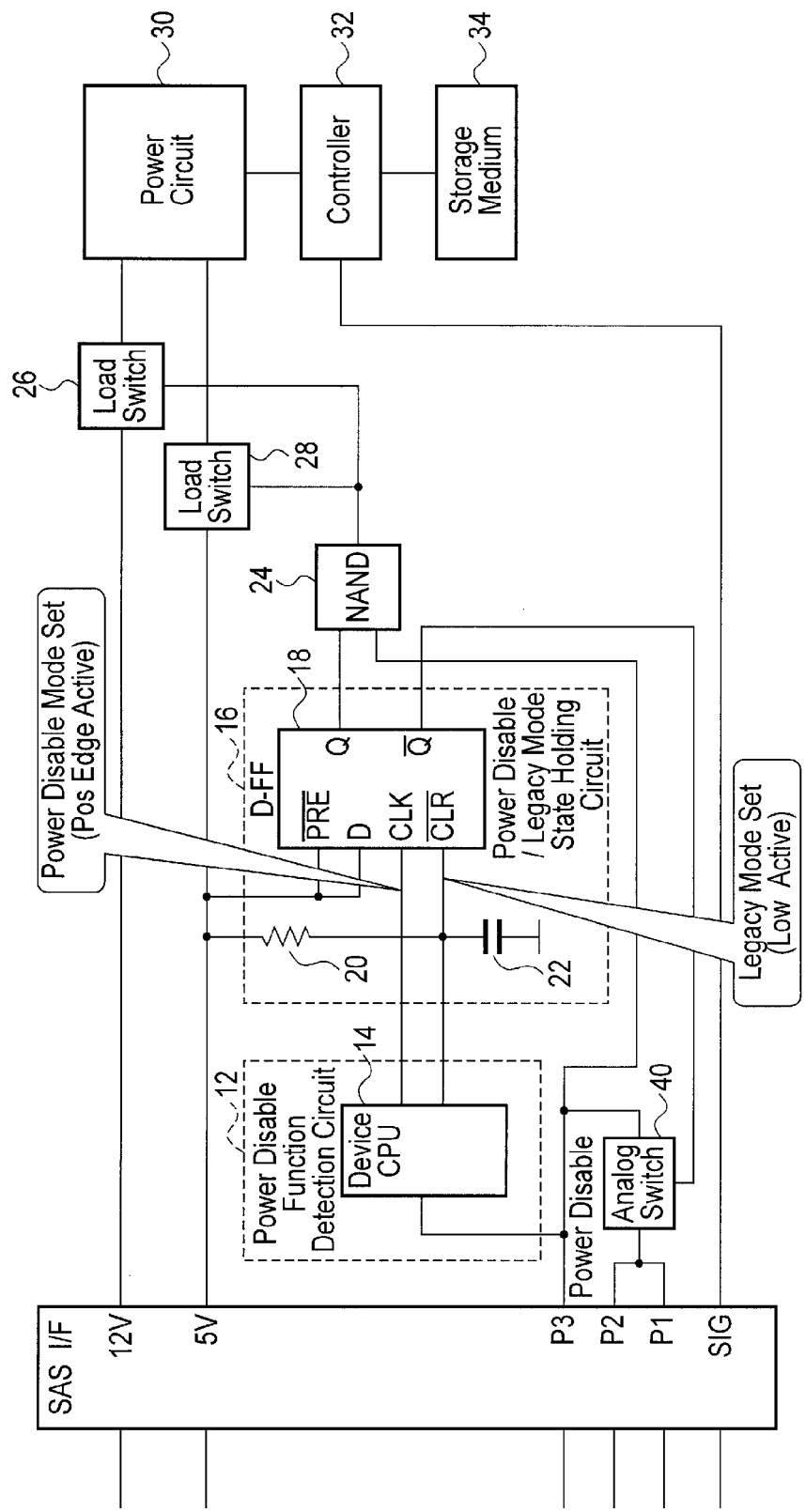
F I G. 4

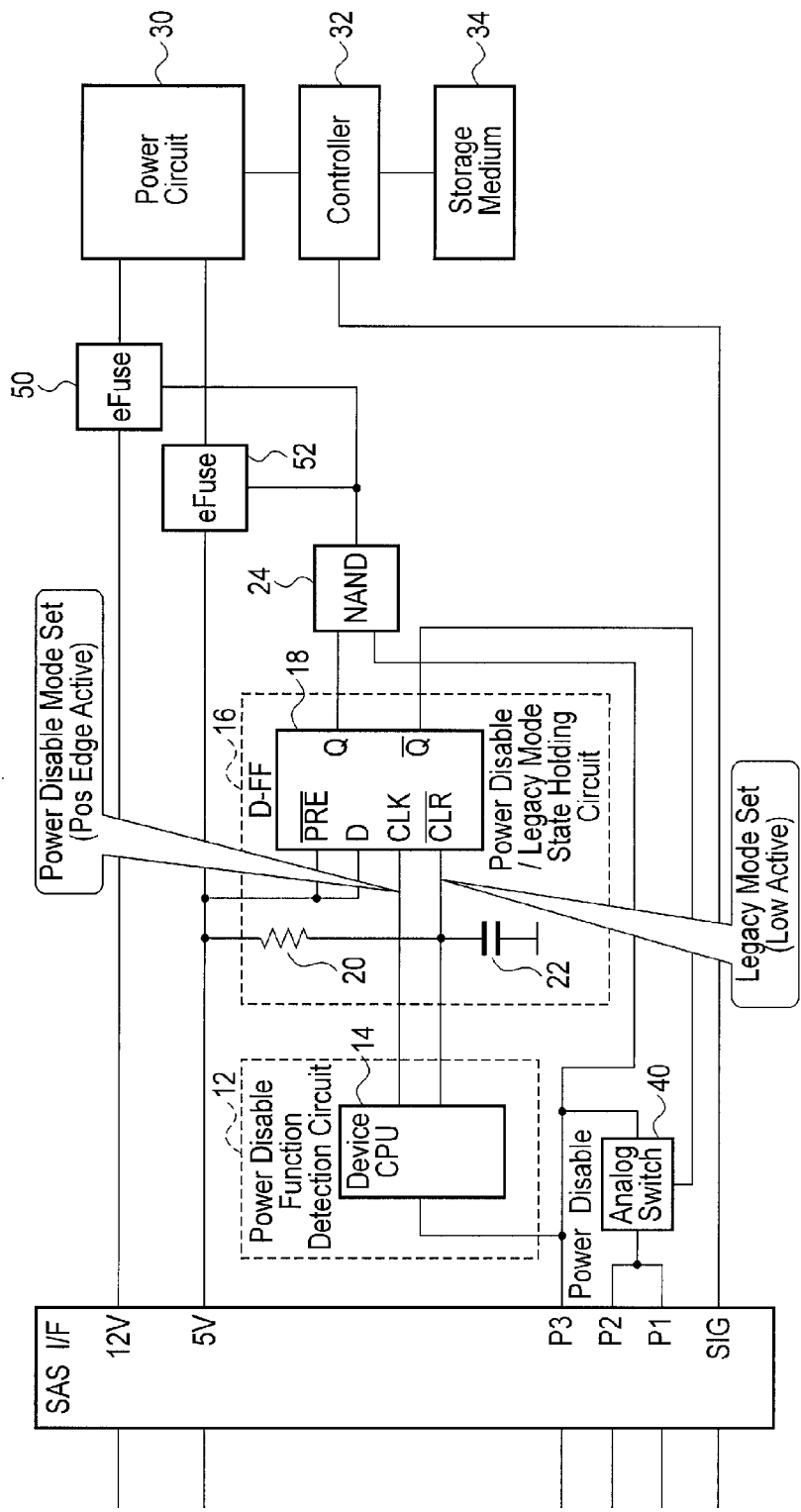
F I G. 5

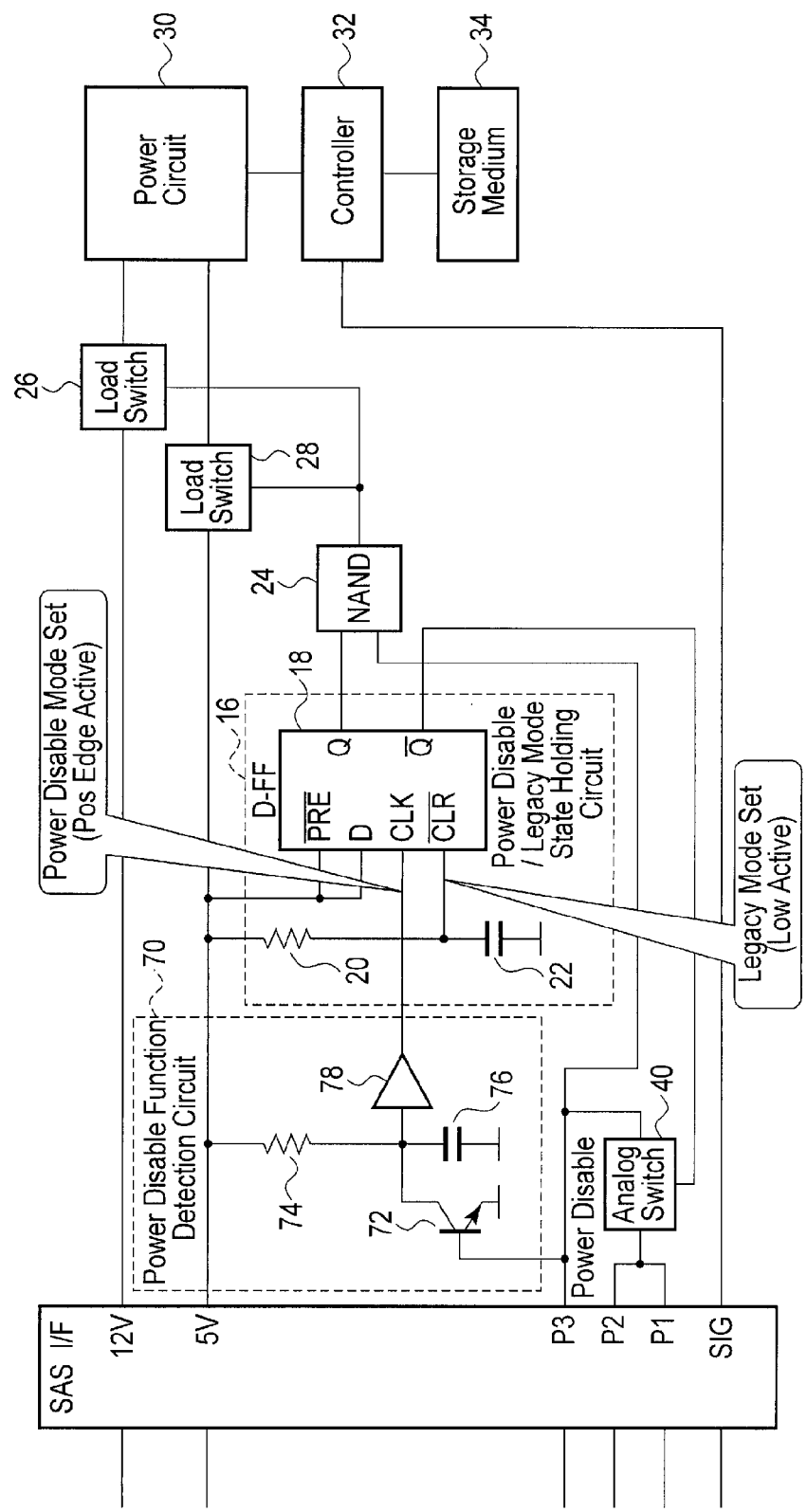
F I G. 7

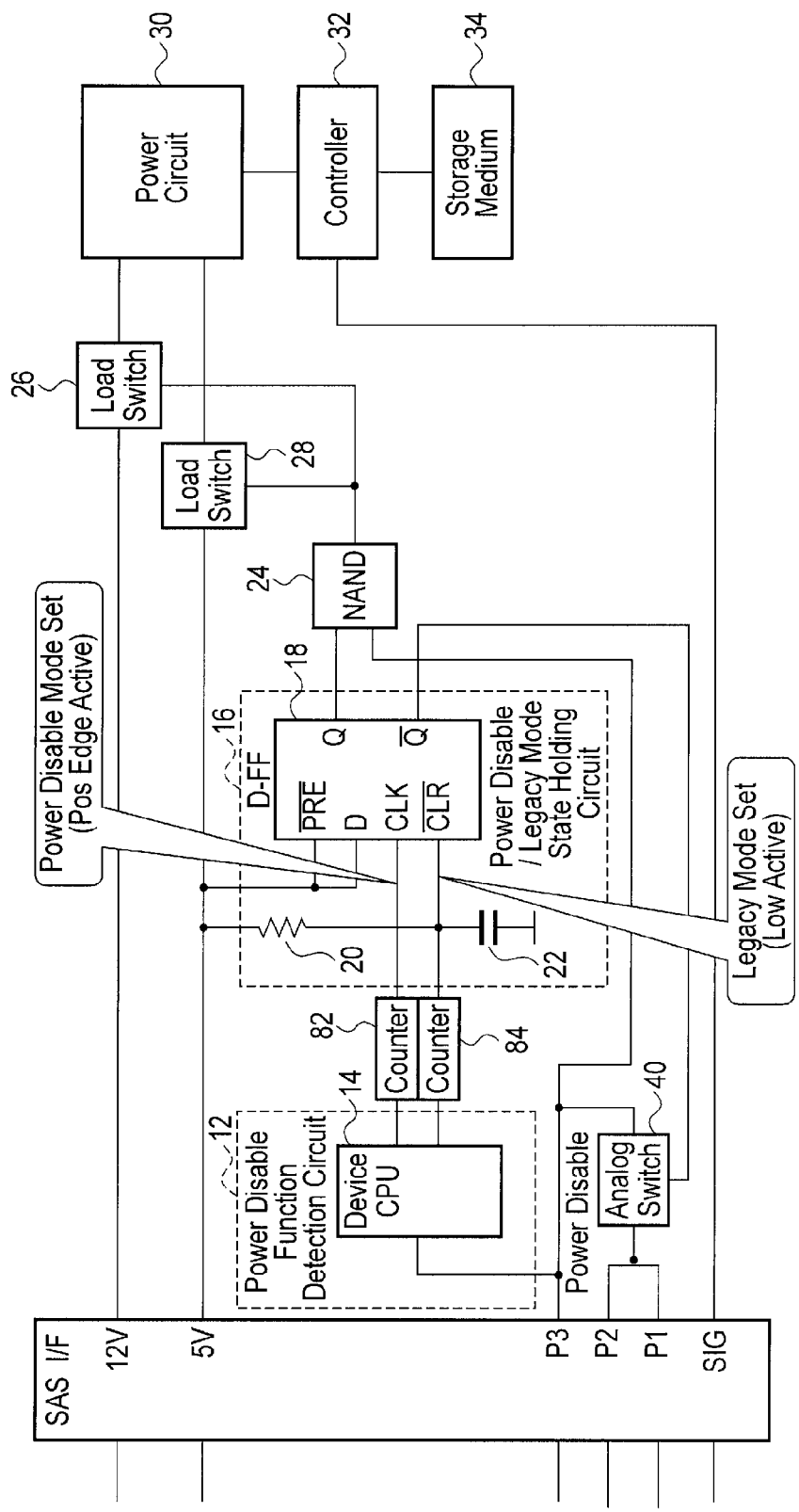
F I G. 8

US 9,946,329 B2

ELECTRONIC APPARATUS

CROSS-REFERENCE TO RELATED APPLICATIONS

This application claims the benefit of U.S. Provisional Application No. 62/095,221, filed Dec. 22, 2014, the entire contents of which are incorporated herein by reference.

FIELD

Embodiments described herein relate generally to an electronic apparatus used in connection with other apparatuses.

BACKGROUND

As an example of such an electronic apparatus, a storage apparatus such as a hard disk drive (HDD) and a solid-state drive (SSD) to be connected to a host such as a PC can be named. As standards for interface between the storage apparatus and the PC, Serial Attached Small Computer System Interface (SAS) and Serial Advanced Technology Attachment (SATA) will be used for example. When the standards are upgraded, compatibility may be partly lost, and consequently, a storage apparatus conforming to the upgraded standard may not be connected to a host conforming to an old standard, in other words, may be uncontrollable under the old host.

Such a state occurs not only in the interface between the storage apparatus and the host but also in any other interface.

BRIEF DESCRIPTION OF THE DRAWINGS

FIG. 1A shows an interface conforming to the SAS-2 standard.

FIG. 1B shows an interface conforming to the SAS-3 standard.

FIG. 1C is a block diagram which shows an example of implementation of a power disable function assigned to the P3 contact in the SAS-3 standard.

FIG. 2 is a timing chart of an example of the power disable function.

FIG. 4 is a block diagram which shows an example of another implementation of the power disable function of the storage device of the embodiment.

FIG. 5 is a block diagram which shows an example of still another implementation of the power disable function of the storage device of the embodiment.

FIG. 7 is a block diagram which shows an example of still another implementation of the power disable function of the storage device of the embodiment.

FIG. 8 is a block diagram which shows an example of still another implementation of the power disable function of the storage device of the embodiment.

DETAILED DESCRIPTION

Figure 3:
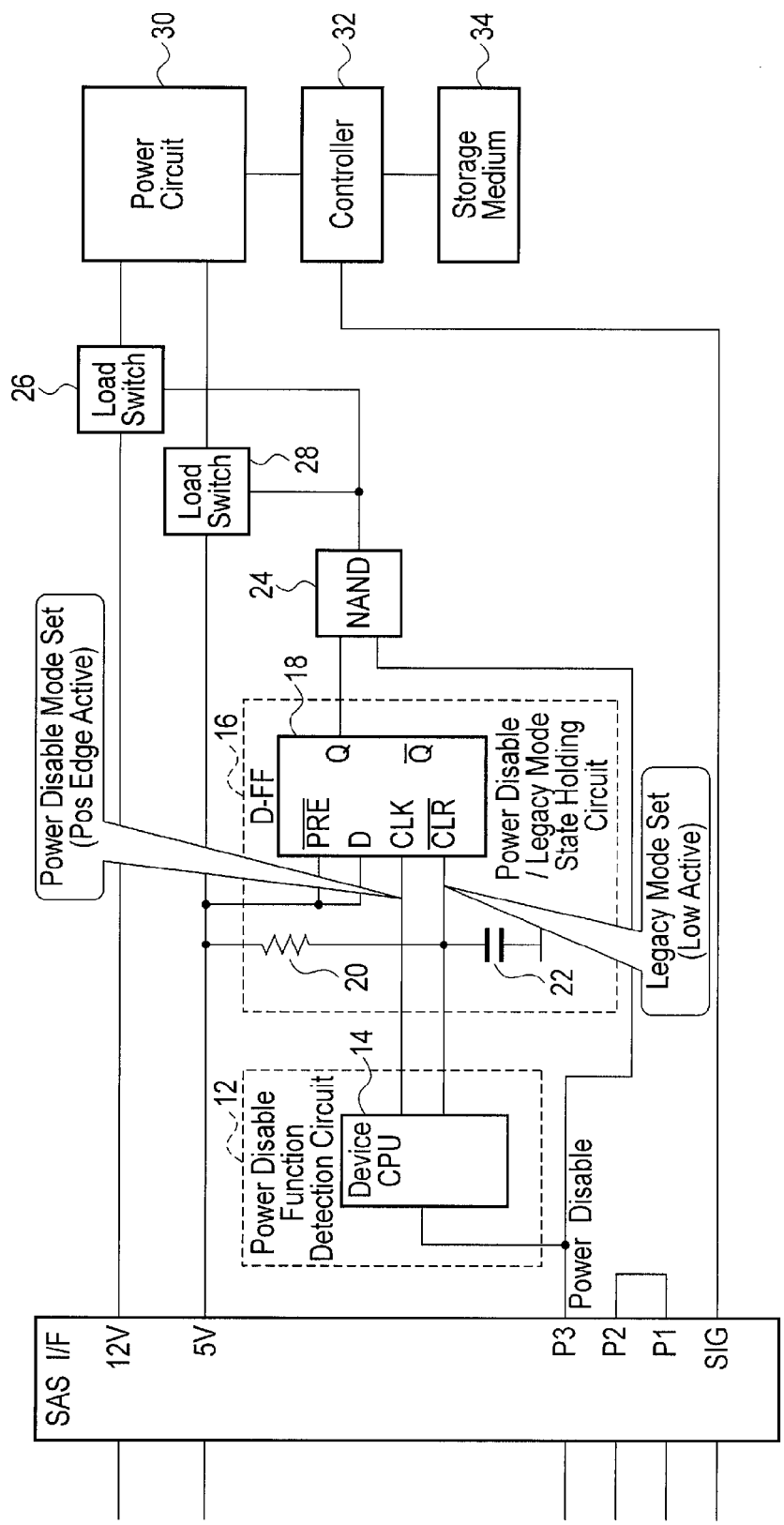
FIG. 3 is a block diagram which shows an example of implementation of the power disable function of the storage device of an embodiment.

In general, according to one embodiment, an electronic apparatus includes a connector, a power circuit, and a controller. The connector is connectable to a first external device of a first kind or a second external device of a second kind. The connector includes a first contact configured to receive a first signal from the first external device or a second signal from the second external device. The second signal is different from the first signal and configured to control power inside the electronic apparatus. The power circuit is configured to generate power inside the electronic apparatus using voltage from the first external device or the second external device. The controller is configured to supply a control signal based on the second signal to the power circuit when the first contact receives the second signal.

Embodiments explained hereinafter are directed to a storage device interface, in particular an SAS interface; however, no limitation is intended thereby.

The interface may be an SATA interface and is not limited to an interface between a storage device and a host.

Initially, for better understanding of the embodiments, the SAS standard is explained. Table 1 shows specifications of the P1, P2, and P3 contacts which are power segments in the SAS-2/SAS-3 standards.

TABLE 1

|    | Before SAS-3 | | Since SAS-3 | |
| --- | --- | --- | --- | --- |
|    | Host | HDD | Host | HDD |
| P1 | 3.3 V | | Vendor Specific | Shorted with P2 |
| P2 | 3.3 V | | Vendor Specific | Shorted with P1 |
| P3 | 3.3 V (Pre-charge Resistor) | | Vendor Specific or Power Disable | Power Disable |

In the SAS-2 standard, P1, P2, and P3 contacts are common and 3.3 V power voltages is input thereto. The length of contact point of P3 contact is greater than that of the P1 and P2 contacts. Thus, when a storage device (hereinafter may simply be referred to as device) is connected to a host, P3 contact conducts before P1 and P2 contacts do. Because a pre-charge resistor is connected to the P3 contact, current gradually flows into the P3 contact to increase its voltage to 3.3 V accordingly. On the other hand, in the SAS-3 standard, P1 and P2 contacts are connected in common at a device side while P3 contact is independent contact which can be used as a power disable contact. Furthermore, a host initiator can allocate a vendor-specific requirement to the P1 and P2 contacts and can allocate a power disable signal or vendor-specific requirement to the P3 contact.

Furthermore, even in an SAS-2 standard system, a 3.3-V power input may rarely be required if a 2.5 inch/3.5 inch HDD is used, and the P1, P2, and P3 contacts may be used in a unique requirement in such a system using the 2.5 inch/3.5 inch HDD. FIG. 1A shows an example of the SAS-2 standard interface with such a structure. In the FIG. 1A, a host is shown at left side and a device is shown at right side. The host may confirm a device connection by, on condition that the P1, P2, and P3 contacts are connected in common at the device side, inputting a certain signal to any one of the P1, P2, and P3 contacts and observing an output signal from either of the remaining contacts.

However, in the SAS-3 standard system corresponding to the power disable function, the P1 and P2 contacts are connected in common while P3 contact is independent contact which is not connected thereto at the device side as shown in FIG. 1B. Thus, in a system in which the P3 contact is used for the connection confirmation, an expected result may not be obtained.

The SAS standard has been upgraded from SAS-2 to SAS-3, and the power disable function support has been added to SAS-3, which uses the P3 contact as a power control signal of the storage device. With this function, the storage device turns on/off the power input based on a power disable signal sent from the host initiator to the P3 contact. Thus, even when a problem due to software in the storage device occurs, the storage device is forcedly initialized by turning on/off the power inside the storage device by the host for recovery.

However, if an SAS-3 standard storage device supporting the power disable function is connected to an SAS-2 standard host wherein the P3 contact is defined as 3.3 V power inputs, a problem that the storage device fails to activate may occur.

Tables 2 and 3 show voltage requirements of the SAS-3 standard.

TABLE 2

| Characteristic | Unit | Min | Max |
| --- | --- | --- | --- |
| Absolute Max Input Voltage Range | V | −0.5 | 3.6 |
| Negate Voltage (Power Enable) | V | −0.5 | 0.7 |
| Assert Voltage (Power Disable) | V | 2.1 | 3.6 |
| Driver sink/source current capability | µA | 100.0 | |
| Power Disable Asserted Hold Time | s | 5.0 | |
| Power Disable Negated Hold Time | s | 30.0 | |

TABLE 3

| Power Disable | State of Power Disable Signal | Action |
| --- | --- | --- |
| Not Supported | Any State | Power Enable |
| Supported | Not Connected | |
| | Negated (Low) | |
| | Asserted (High) | Power Disable |
| | Asserted → Negated | Power On Event |

From Tables 2 and 3, the following can be acknowledged.

(1) Power is turned on when nothing is connected to power disable signal (P3 contact).

(2) Power is turned on when power disable signal is 0.7 V or less (negated).

(3) Power disable is activated when hold time in negate state is 30 seconds (minimal) and power disable signal is asserted.

(4) Power is turned on when hold time in negate state is 30 seconds (minimal) and power disable signal is asserted and then negated.

As can be understood from the above, the device cannot be activated unless the P3 contact is low (0.7 V or less) in the SAS-3 standard. Thus, a device conforming to the SAS-3 standard is not compatible with a system conforming to the ordinary SAS-2 standard. In consideration of this point, individual design, manufacture, and distribution are required for each of SAS-2 standard devices and SAS-3 standard devices.

FIG. 1C shows a circuit structure which controls the device power (+12 V and +5 V) based on the logic level of the power disable signal of the P3 contact conforming to the SAS-3 standard. The power of +12 V and +5 V from the host is supplied via load switches 2 and 4 to a power circuit which is an inner circuit (not shown). The signal of the P3 contact turns on/off the load switches 2 and 4 via, for example, the inverter 6. If the P3 contact is high (the output of the inverter 6 is low), the load switches 2 and 4 are turned off and no power is supplied to the power circuit. If the P3 contact is low (the output of the inverter 6 is high), the load switches 2 and 4 are turned on and power is supplied to the power circuit. Therefore, in the system which supplies 3.3 V to the P3 contact according to the ordinary SAS-2 standard, the power disable signal assigned to the P3 contact goes high and thus, the SAS-3 standard device cannot be activated without power supplied thereto.

Furthermore, the device cannot be activated in a system which supplies a high signal to the P3 contact using a vendor-specific requirement in the SAS-2 standard.

Furthermore, in a system which inputs a signal to the P3 contact and receives an output signal from the P1 and P2 contacts, device identification from an initiator cannot be performed. The same applies to a system which inputs a signal to either the P1 contact or the P2 contact and receives an output signal from the P3 contact.

In the embodiment, the power disable signal from the host to be input to the P3 contact is received by the storage device at its firmware or hardware. The storage device determines whether or not the signal of the P3 contact is a power disable signal based on the state transition of the signal and performs power control based on the determination result. Therefore, a storage device of high versatility which can adapt to not only a host corresponding to the power disable function of the SAS-3 standard but also a host of a conventional specification or of a specific requirement.

An example of implementation of the power disable function of the embodiments is explained with reference to a timing chart of the basic operation shown in FIG. 2. As in FIG. 2, in the SAS-3 standard, a power disable control signal transferred from the initiator is specified to be high if it is being low for a certain period (30 seconds) or more. In the embodiments, the storage device confirms the state transition of the signal of the P3 contact in its firmware or hardware to determine whether or not the signal input to the P3 contact is a power disable signal conforming to the SAS-3 standard. If the signal is determined to be the power disable signal conforming to the SAS-3 standard, the storage device performs the power control of the storage device by the P3 contact signal (power disable signal). If the signal is not determined to be the power disable signal, the storage device determines the P3 contact signal to be a voltage signal conforming to the SAS-2 standard and performs an operation based thereon.

An example of a method of determination of the state transition of the signal in the P3 contact will be explained.

(#1) Regardless of a signal level in the P3 contact, the host and the device are turned on and observation of the signal in the P3 contact is initiated.

(#2) If the low level (negate state) continues for 30 seconds or more in the P3 contact, the system is determined to have the power disable function.

That is, because any system with the power disable function has a negate period of at least 30 seconds as its requirement before the power disable signal is asserted, the power disable function can be acknowledged by (#2).

If the P3 contact is open or is fixed to be low by the device specification, the power state does not vary unless a state transition of the signal in the P3 contact is detected; however, the signal in the P3 contact is set to high in some systems to prevent the device activation. Such systems cannot be distinguished from the systems conforming to the ordinary standard and the prevention of device activation is not achieved despite the client's request. However, the hardware reset of the device is still achievable. Note that the SAS standard has a staggered spin-up function for preventing current in the activation process, and with this function, the prevention of device activation is achievable to some extent. In FIG. 2, the POWER DISABLE signal state indicates a signal level of the P3 contact supplied from the host to the storage device. OUTSIDE SAS TARGET indicates a signal level of each of +12 V signal line and +5 V signal line at the host side. Internal Power state on SAS TARGET indicates a signal level of each of +12 V signal line and +5 V signal line in the storage device. Operation indicates a power state. The power state includes states of ANY, Normal (Operation; power on), and power disable (power off). When the P3 signal is negated, the power is turned on. When the P3 signal is asserted, the signal level of +12 V signal line and +5 V signal line in the storage device is lowered, and when the signal level of +12 V signal line and +5 V signal line is below a threshold, the power is turned off.

FIG. 3 is a block diagram which shows an example of implementation to achieve the power disable function of the storage device of the present embodiment. FIG. 3 exemplifies the SAS-3 interface between the host and the device (storage device) including +12 V and +5 V power contacts, the P1, P2, and P3 contacts, and signal contact SIG (power contacts and signal contact are shown as singular but they are actually plural). In addition thereto, the SAS-3 interface includes a ground contact and the like. Each of +12 V power and +5 V power from the host is supplied to a power circuit 30 via the load switches 26 and 28. The power circuit 30 includes a DC/DC converter and the like, generates a predetermined operation voltage from the +12 V power and +5 V power, and supplies the operation voltage to each circuit in the device including a controller 32. The controller 32 controls data write into a storage medium 34 such as a hard disk and a flash memory and data read from the storage medium 34. Commands such as read/write and a control signal from the host are supplied to the controller 32 via the signal contact SIG of the SAS interface. The P1 contact and P2 contact are connected to each other. A power disable signal supplied from the host via the P3 contact is supplied to a power disable function detection circuit (hereinafter referred to as PD detection circuit) 12 and NAND gate 24.

The PD detection circuit 12 includes a device CPU 14 and executes a detection program which is stored in a nonvolatile memory or the like (not shown). That is, the PD detection circuit 12 is achieved in firmware. The detection program performs the above-described determination methods of (#1) and (#2), and the device CPU 14 outputs a signal to activate the power disable function (signal which is active at an edge to be high from low) or a signal to negate the power disable function (signal which is active low). The device CPU 14 outputs the signal to negate the power disable function for enabling the host to negate the power disable function. However, this function may be omitted, and the device CPU 14 may only output the signal to activate the power disable function. The controller 32 may be omitted and the device CPU 14 can be used as the controller 32. The signals to activate and negate the power disable function can be set forcedly by the commands from the host.

The storage device includes a power disable/legacy mode state holding circuit (hereinafter referred to as PD/LM state holding circuit) 16. The PD/LM state holding circuit 16 includes a D type flip-flop (D-FF) 18, a resistor 20 connected between clear bar contact (/CLR) of D-FF 18 and +5 V, and capacitor 22 connected between the clear bar contact (/CLR) and a ground. A preset bar contact (/PRE) of D-FF 18 and a D input contact are connected to +5 V. The signals to activate and negate the power disable function are supplied to a clock contact CLK of D-FF 18 and the clear bar contact (/CLR). Here, an XX bar contact (/XX) indicates that the contact XX is negative logic. When the signal to activate the power disable function is input to the clock contact CLK (when the signal goes high), the PD/LM state holding circuit 16 holds the active state of the power disable function (power disable mode) and make the Q contact high. When the signal (low level signal) to negate the power disable function is input to the clear bar contact (/CLR), the PD/LM state holding circuit 16 holds the negate state of the power disable function (that is, legacy mode) and set a Q bar contact (/Q) to low level. The output from Q contact of D-FF 18 is connected to the input of NAND gate 24. A signal from the P3 contact is supplied to the other input of NAND gate 24. The output of NAND gate 24 is supplied to the control contact of the load switches 26 and 28. The load switches 26 and 28 are conducted if the control contact is high and not conducted if it is low to control the power supply of +12 V and +5 V to the power circuit 30. NAND gate 24 thus selectively blocks the P3 signal based on state holding results of the PD/LM state holding circuit 16. Note that other gate elements than NAND can be used as long as they can block the P3 signal.

If the storage device is connected to a host conforming to the SAS-2 standard, the P3 contact is constantly 3.3 V, and the PD detection circuit 12 does not output the signal to activate PD function. Thus, the output from the Q contact of the PD/LM state holding circuit 16 is at low level. Although the P3 contact is high, the output of NAND gate 24 goes high, the load switches 26 and 28 are turned on, and +12 V power and +5 V power are supplied to the power circuit 30.

If the storage device is connected to a host conforming to the SAS-3 standard, the signal of the P3 contact is at low level, and the PD detection circuit 12 does not output the signal to activate the power disable function before the low level continues for 30 seconds or more. Thus, the Q output of the PD/LM state holding circuit 16 is at low level. Since the P3 contact is at the low level, the output of NAND gate 24 goes high, the load switches 26 and 28 are turned on, and +12 V power and +5 V power are supplied to the power circuit 30. After the low level continues for 30 seconds or more in the P3 contact, the PD detection circuit 12 outputs the signal to activate the power disable function. Thereby, the Q contact of D-FF 18 goes high. The power disable signal has a hold time in the negate state of 30 seconds (minimum) and then is asserted. When the power disable signal is asserted, the output of NAND gate 24 becomes low, the load switches 26 and 28 are turned off, and +12 V and +5 V power supply to the power circuit 30 is shut down. Then, when the power disable signal is negated, the output of NAND gate 24 goes high, the load switches 26 and 28 are turned on, and +12 V power and +5 V power are resupplied to the power circuit 30.

When the signal to negate the power disable function is output from the device CPU 14, the Q contact of D-FF 18 changes to low. The output of NAND gate 24 goes high, the load switches 26 and 28 are turned on, and +12 V power and +5 V power are supplied to the power circuit 30.

According to the embodiment, the power disable signal from the host to be input to the P3 contact is received in the firmware and the power control is performed based on the P3 signal. Thereby, a highly versatile device which can correspond to not only the host corresponding to the power disable function conforming to the SAS-3 standard but also a host conforming to the SAS-2 standard and a host having specific specification. Since there is no need to develop or distribute devices specified to each standard, the development and distribution can be unified and resources and costs for production can be reduced. Note that the commands such as read and write supplied from the host to the storage device may be different between the host conforming to SAS-2 and the host conforming to SAS-3.

Furthermore, the PD/LM state holding circuit 16 holds the power disable function detection results achieved by the firmware. Therefore, even if the firmware has an abnormal condition such as hang-up, once the detection result is obtained, the power control can be performed by hardware of load switches 26 and 28 based on the P3 signal from NAND gate 24. The system recovery can be further secured. In the example of FIG. 3, D-FF 18 is used as the state holding circuit; however, no limitation is intended thereby, and an RS type flip-flop or JK type flip-flop or other latched circuits can be used as long as they can hold the determination result from the firmware.

Now, variations of the embodiment will be explained. As in Table 1, in the SAS-3 standard, a vendor-specific function can be assigned to the P3 contact instead of the power disable function. For example, when the P1 and P2 contacts are connected to each other, the system independently checks a connection between the P3 contact and the P1/P2 contact to determine whether a device is connected or not. If a connection between the P3 contact and the P1/P2 contact is detected, the device connection is acknowledged. In such a system, however, the device conforming to the SAS-3 standard shown in FIG. 3 cannot obtain an expected result since the P3 contact is independent.

Thus, in first variation, an analogue electronic switch 40 is connected between the P3 contact and the P1/P2 contact as shown in FIG. 4. When the power disable function is not detected (when the power disable function is negated), the electronic switch 40 is turned on, and thereby, the above-mentioned problem may be avoided. The Q bar contact (/Q) of D-FF 18 is connected to a control contact of the electronic switch 40. The logic used in this variation is that the electronic switch 40 is turned on if the control contact is high.

The PD function detection circuit 12 does not output a signal to activate the power disable function immediately after the device is turned on since it is in a before-determined state. Thus, the Q bar contact (/Q) of D-FF 18 is high and the electronic switch 40 is turned on. Therefore, the system checks the connection between the P3 contact and the P1/P2 contact immediately after the device is turned on to determine whether a device is connected or not. Even if the power disable function is activated, the power disable function is not determined to be active before 30 seconds from turning on the power. Therefore, the device connection determination can be completed during this period.

The above explanation is related to a case where the power supply to the power circuit 30 is controlled using the load switches 26 and 28. An electrically programmable fuse element (eFuse) can be used instead of the load switches 26 and 28. FIG. 5 shows a variation using eFuses 50 and 52 instead of the load switches 26 and 28 in FIG. 4. Note that, although this is not depicted, a variation using eFuses instead of the load switches 26 and 28 in FIG. 3 can be adopted.

Figure 6:
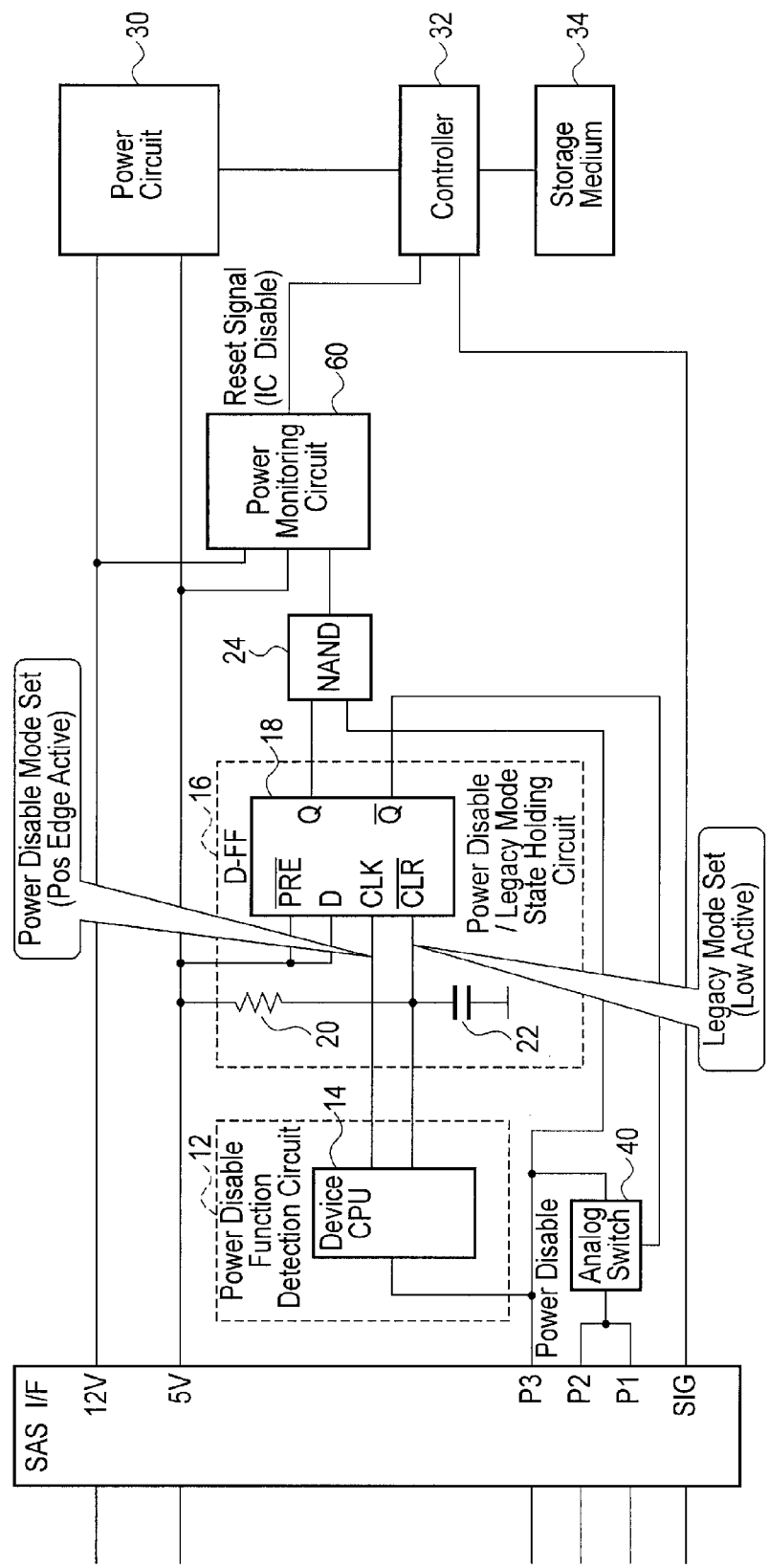
FIG. 6 is a block diagram which shows an example of still another implementation of the power disable function of the storage device of the embodiment.

The above explanation is related to a case where a circuit element inside a device is reset by blocking power supply to the power circuit 30. If the device has a power monitoring circuit, the power monitoring circuit outputs a reset signal to set the circuit element inside the device to disable in many cases. In that case, if the signal of P3 contact is incorporated in the reset signal as shown in FIG. 6, the power supply blocking can be substituted. The output of NAND circuit 24 is connected to the power monitoring circuit 60, +12 V power and +5 V power are supplied to the power circuit 30 and are input (connected) to the power monitoring circuit 60. The power monitoring circuit 60 supplies a reset signal to a controller 32 if the output of NAND gate 24 is low, and resets the controller 32. Thereby, even if a problem occurs in the software of the device, the circuit element in the device can be reset, and the device can be recovered. Although this is not depicted, the power control circuit 60 can be applied to any of the circuits shown in FIGS. 3, 4, and 5.

The above explanation is related to a case where a PD detection circuit 12 is realized as firmware. Now, a variation of the PD detection circuit shown in FIG. 7 is explained. FIG. 7 shows an example in which the PD detection circuit 12 in FIG. 4 is realized as hardware (timer circuit). A +5 V contact is grounded via a resistor 74 and a capacitor 76. An emitter of a transistor 72 is grounded and a collector is connected to a connection point of the resistor 74 and capacitor 76. P3 contact is connected to a base of the transistor 72. The connection point of the resistor 74 and the capacitor 76 is connected to a clock contact CLK of F-FF 18 via an amplifier 78. That is, the output of the amplifier 78 corresponds to a signal to activate the power disable function.

When the P3 contact is low, the transistor 72 is turned off, and the capacitor 76 is charged by current from the +5 V power flowing the resistor 74, and the input of the amplifier 78 increases gradually. When the input signal exceeds a certain threshold value, the output of the amplifier 78 goes high and the amplifier 78 outputs the signal to activate the power disable function. The time constant of the resistor 74 and the capacitor 76 is set such that the output of the amplifier does not go high unless the P3 contact stays low for at least 30 seconds. Therefore, if the P3 contact once goes low and then goes high after less than 30 seconds, the transistor 72 is turned on, and the capacitor 76 is discharged via the transistor 72.

The PD detection circuit 70 and the PD/LM state holding circuit 16 in FIG. 7 may be integrated in one IC. Furthermore, the PD detection circuit 70 and the PD/LM state holding circuit 16 may be incorporated into a circuit element preexistent in the device such as a system-on-a-chip and a servo combo controller of the storage device. Thereby, advantages such as size and cost reduction are expected.

In the above-mentioned example using the PD detection circuit 12 realized as firmware, activating the power disable function is detected and a high level signal is transmitted for once, the power disable function is realized. However, a detection signal (high level signal) may possibly be generated unintentionally due to erroneous setting or fault of the firmware. Furthermore, even if the PD detection circuit 70 is realized by the hardware timer of FIG. 7, an erroneous detection may occur. Therefore, as shown in FIG. 8, a counter circuit 82 may be connected between a signal output contact of the PD detection circuit 12 to activate the power disable function and the PD/LM state holding circuit 16 such that a high level signal is supplied to the clock contact CLK of D-FF 18 after the PD detection circuit 12 outputs a signal to activate the power disable function for predetermined times. Furthermore, a counter circuit 84 may be connected between a signal output contact of the PD detection circuit 12 to negate the power disable function and the PD/LM state holding circuit 16 such that a signal of low level is supplied to the clear bar contact (/CLR) of D-FF 18 after the PD detection circuit 12 outputs a signal to negate the power disable function for predetermined times. Thereby, an erroneous detection due to noise and the like can be prevented and device reliability can be improved. FIG. 8 corresponds to the structure of FIG. 4 with the counter circuits 82 and 84; however, the counter circuits 82 and 84 may be added to the structures of FIGS. 3, 5, 6, and 7.

In the example explained above, the PD/LM state holding circuit 16 can change the state held, for example, the state to activate the power disable function to the state to negate the power disable function or change oppositely. This is because, the device connection is changed freely such that the device is connected to a host conforming to the SAS-2 standard, and then connected to a host conforming to the SAS-3 standard, or oppositely, the device is connected to a host conforming to the SAS-3 standard and then to a host conforming to the SAS-2 standard. However, it is actually rare that a user who buys a device conforming to both standards has hosts conforming to both standards and changes the connection host of the device. Therefore, the device may be realized to be connected to a host conforming to one standard once and not be connected to a host conforming to the other standard. In this variation, the PD/LM state holding circuit may hold the state fixedly and includes a fuse which is blowable by a logic signal.

Figure 9:
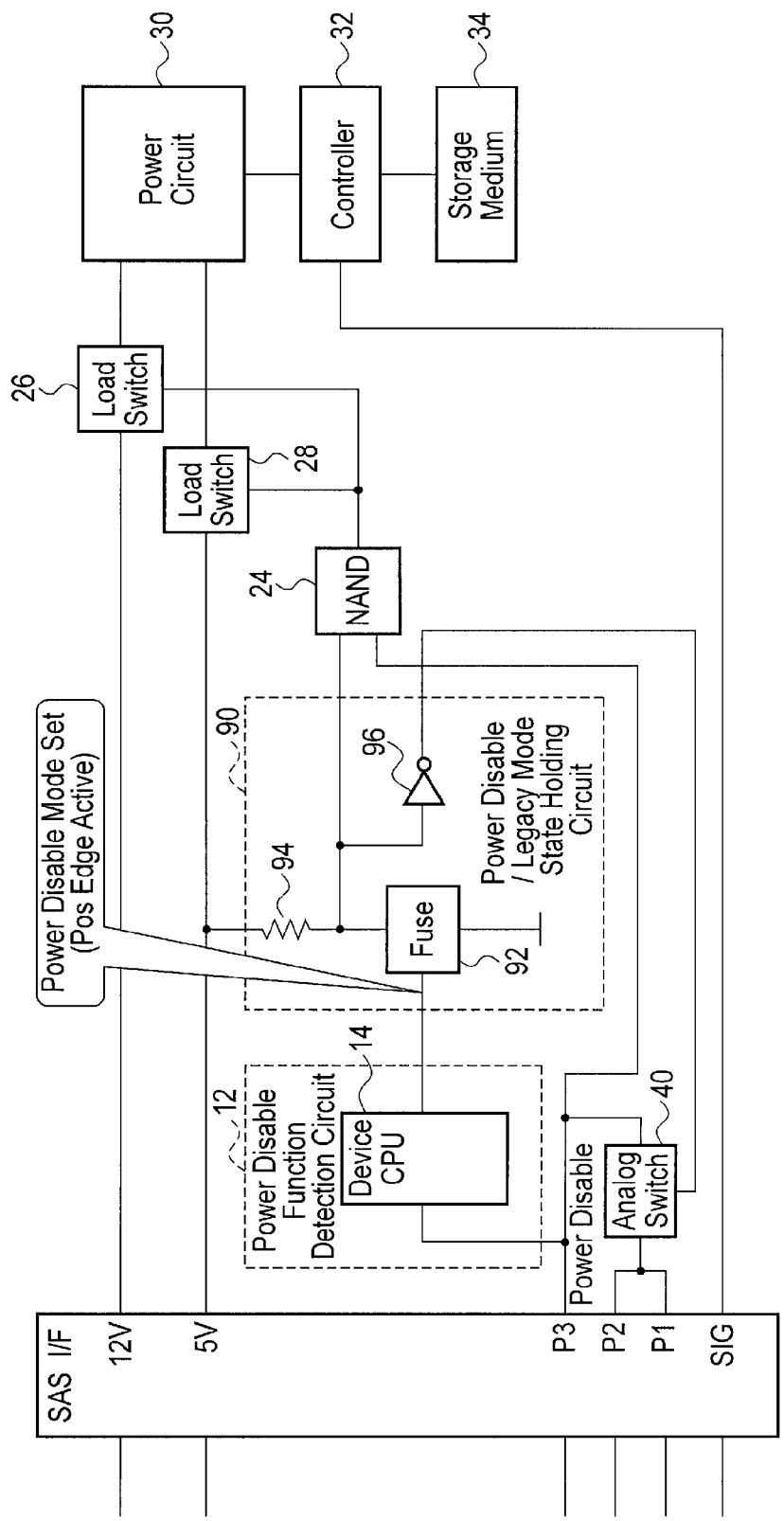
FIG. 9 is a block diagram which shows an example of still another implementation of the power disable function of the storage device of the embodiment.

FIG. 9 shows a variation of the structure of FIG. 4 with the PD/LM state holding circuit 90 including a fuse 92 instead of the PD/LM state holding circuit 16. The fuse 92 is blowable by a logic signal. A resistor 94 and the fuse 92 are connected in series between +5 V and a ground. The connection point of the resistor 94 and the fuse 92 is connected to an input of NAND gate 24 and to a control contact of the electronic switch 40 via an inverter 96. The PD detection circuit 12 supplies a signal to activate the power disable function to the control contact of the fuse 92. The fuse 92 is blown if the control contact is high. Therefore, if the PD detection circuit 12 supplies the signal to activate the power disable function to the control contact of the fuse 92, the fuse 92 is blown. After that, the connection point of the resistor 94 and the fuse 92 is made high. At the time when the signal to activate the power disable function, the P3 contact is made high, and thus, after the cut off of the fuse 92, the output of NAND gate 24 is low, the load switches 26 and 28 are turned off and +12 V and +5 V power supply is shut down. Note that, in this variation, the device can be connected to a host conforming to the SAS-2 standard with the fuse 92 which is not blown (is still connected) and then be connected to a host conforming to the SAS-3 standard with the fuse 92 blown; however, the opposite thereof cannot be performed (a device connected to a host conforming to the SAS-3 standard with the fuse 92 blown cannot be connected to a host conforming to the SAS-2 standard). Note that, in this variation, after the fuse is blown based on the determination of the activation of the power disable function is made in the initial determination process, power prevention in an activation process can be expected as an additional merit. Although this is not depicted, this variation can be realized by replacing the PD/LM state holding circuit 16 in FIGS. 3, 5, 6, 7, and 8 with the PC/LM state holding circuit 90.

As mentioned above, in the embodiment, if the observation shows that the signal input to the P3 contact is being low for 30 seconds or more, the signal is determined to correspond to the power disable function and the determination result is held. If the determination result held shows it corresponds to the power disable function (activate the power disable function), the power control by the P3 contact input is activated, and if the determination result held shows it does not correspond to the power disable function (negate the power disable function), the input to the P3 contact is ignored. When the power control by the P3 contact input is activated, power conduction/shut down of the device is performed based on the input of the P3 contact. Thereby, it is possible to provide a storage device which activates the power disable function conforming to the SAS-3 standard wherein the signal of the P3 contact is used to control a power input to the device as well as can correspond to the system conforming to the SAS-2 standard.

Some of the systems conforming to the SAS-2 standard include specific P1, P2, and P3 contacts to determine whether a device is connected or not by inputting a signal from a host to the P1/P2 contact and observing a signal from the P3 contact. To correspond to such systems, the embodiment includes P1 and P2 which are common contacts connected to P3 contact via an electronic switch, and if a determination result shows that the power disable function be negated, the electronic switch is turned on. Thereby, when the power disable function is negated, the P1/P2 contact is connected to the P3 contact. Thus, whether or not a device is connected can be determined even in the SAS-2-conformant systems including specific P1, P2, and P3 contacts.

As an element to activate and negate the power control, an electrically programmable fuse element having a power shut down function and external controllability.

Instead of a load switch or an electrically programmable fuse element for the power control, a power monitoring circuit having a reset function may be provided to set the circuit element in the device to disable by a signal synthesizing the P3 signal and the reset signal. If the device has an initialize function of the inner circuit, the device can be initialized by synthesizing the reset signal and the P3 signal, and the power monitoring circuit can substitute for the power control circuit. Therefore, the power control circuit is not necessary and the cost down can be achieved.

As a circuit to detect the P3 contact being in low state for 30 seconds or more, a hardware timer circuit can be used. Thereby, the PD detection circuit can be realized as a specific IC, or can be incorporated in a circuit element preexistent in the device such as a system-on-a-chip and servo combo driver. The specific IC is either mass-produced or incorporated into a conventional LSI, cost reduction can be expected.

A counter circuit may be connected between the output contact of the determination result of the power disable function and a circuit to hold the result such that if a detection circuit detects predetermined times of the function, the holding circuit holds the determination result. Thereby, erroneous determination due to noise and malfunction can be prevented and further stable operation can be achieved.

Instead of the circuit to hold the determination result, a fuse to be cut down by a logic signal may be used. The circuit to hold the determination result loses the content held thereby whereas this structure using the fuse can hold determination result permanently.

The above description has been directed to the implementation of a novel function (power disable function) assigned to the P3 contact when the SAS interface of a storage device (HDD or SSD) is upgraded from SAS-2 to SAS-3. However, the embodiment can be applied to any other interface. For example, SATA interface is explained. In the SATA interface, a device sleep (DEVSLP) function is assigned to the P3 contact in the latest Rev 3.2. In the old standard, 3.3 V is applied to the P3 contact. Furthermore, there is a proposal to assign a power disable (PWDIS) function to the P3 contact for a new standard of SATA. The device sleep function of SATA is negated in the initial state immediately after the activation and the function is activated by a command of device sleep activate made at the host side. Therefore, a signal input to the P3 contact is not necessarily observed at the device side to determine which standard the host corresponds to. However, if the above embodiments are used, the device sleep function can be activated even in the initial state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a connector connectable to a first external device complying with a first revision/version of Serial Attached Small Computer System Interface (SAS) or Serial Advanced Technology Attachment (SATA) or a second external device complying with a second revision/version of SAS or SATA, the connector comprising a first contact configured to receive a first signal from the first external device or a second signal from the second external device, the second signal being different from the first signal and configured to control power inside the electronic apparatus;
   a power circuit configured to generate power inside the electronic apparatus using voltage from the first external device or the second external device; and
   a controller configured to supply a control signal based on the second signal to the power circuit when the first contact receives the second signal.

2. The electronic apparatus of claim 1, wherein the connector further comprises a second contact and a third contact, wherein the second contact and the third contact are connected to each other when the connector is connected to the second external apparatus, and the second contact and the third contact are supplied with a voltage signal when the connector is connected to the first external apparatus.

3. The electronic apparatus of claim 2, wherein the first revision/version of SAS or SATA is an older revision/version and the second revision/version of SAS or SATA is a newer revision/version.

4. The electronic apparatus of claim 3, wherein
   a level of the second signal input to the first contact maintains a first level for a first period or more, is changed to a second level, and maintains the second level for a second period or more.

5. The electronic apparatus of claim 4, wherein
   the controller comprises a hardware timer configured to measure the first period and the second period or a state transition detection module executed by a processor.

6. The electronic apparatus of claim 3, wherein
   the controller comprises a storage module configured to store information indicating that the first contact receives the second signal, and
   the storage module comprises a D type flip-flop, RS type flip-flop, JK type flip-flop, latch, or a fuse which is blowable by a logic signal.

7. The electronic apparatus of claim 3, wherein
   the connector comprises a power contact,
   the controller comprises a conduction control element between the power contact and the power circuit, and
   the conduction control element comprises a load switch or an electrically programmable fuse and is configured to connect the power contact to the power circuit when the first contact receives the second signal.

8. The electronic apparatus of claim 3, wherein
   the power circuit comprises a power monitoring circuit configured to generate a reset signal to reset an inner circuit of the electronic apparatus when the first contact receives the second signal.

9. The electronic apparatus of claim 3, wherein
   the connector comprises a second contact and a third contact connected to each other,
   the controller comprises a conduction control element connected between the first contact and the second and third contacts, and
   the conduction control element is configured to conduct the first contact to the second and third contacts when the first contact receives the first signal.

10. The electronic apparatus of claim 3, wherein
    the controller comprises a counter configured to operate in response to reception of the second signal by the first contact.

11. A method for an electronic apparatus, the electronic apparatus comprising a connector connectable to a first external device complying with a first revision/version of Serial Attached Small Computer System Interface (SAS) or Serial Advanced Technology Attachment (SATA) or a second external device complying with a second revision/version of SAS or SATA, the connector comprising a first contact configured to receive a first signal from the first external device or a second signal from the second external device, the second signal being different from the first signal and configured to control power inside the electronic apparatus; and a power circuit configured to generate the power inside the electronic apparatus using voltage from the first external device or the second external device, the method comprising:
    supplying a control signal based on the second signal to the power circuit when the first contact receives the second signal.

12. The method of claim 11, wherein the connector further comprises a second contact and a third contact, wherein the second contact and the third contact are connected to each other when the connector is connected to the second external apparatus, and the second contact and the third contact are supplied with a voltage signal when the connector is connected to the first external apparatus.

13. The method of claim 12, wherein the first revision/version of SAS or SATA is an older revision/version and the second revision/version of SAS or SATA is a newer revision/version.

14. The method of claim 13, wherein
    a level of the second signal input to the first contact maintains a first level for a first period or more, is changes to a second level, and maintains the second level for a second period or more.

15. The method of claim 14, comprising:
measuring the first period and the second period by a hardware timer or a state transition detection module executed by a processor.

16. The method of claim 13, wherein
the electronic apparatus comprising a storage module configured to store information indicating that the first contact receives the second signal, and
the storage module comprises a D type flip-flop, RS type flip-flop, JK type flip-flop, latch, or a fuse which is blowable by a logic signal.

17. The method of claim 13, wherein
the connector comprises a power contact,
the method comprises connecting the power contact to the power circuit through a conduction control element when the first contact receives the second signal, and
the conduction control element comprises a load switch or an electrically programmable fuse.

18. The method of claim 13, comprising:
generating a reset signal to reset an inner circuit of the electronic apparatus when the first contact receives the second signal.

19. The method of claim 13, wherein
the connector comprises a second contact and a third contact connected to each other,
the method further comprising conducting the first contact to the second and third contacts through a conduction control element when the first contact receives the first signal.

20. The method of claim 13, comprising:
operating with a counter in response to reception of the second signal by the first contact.

* * * * *